(12) United States Patent  
Ando et al.

(10) Patent No.: US 9,001,460 B2
(45) Date of Patent: Apr. 7, 2015

(54) SPINDLE MOTOR, AND DISK DRIVE APPARATUS

(71) Applicant: Nidec Corporation, Kyoto (JP)

(72) Inventors: Hironori Ando, Kyoto (JP); Mitsuhiro Takemoto, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/330,207

(22) Filed: Jul. 14, 2014

(65) Prior Publication Data

US 2015/0055247 A1 Feb. 26, 2015

Related U.S. Application Data

(60) Provisional application No. 61/868,190, filed on Aug. 21, 2013.

(51) Int. Cl.
*H02K 7/08* (2006.01)
*G11B 19/20* (2006.01)

(52) U.S. Cl.
CPC ............ *H02K 7/086* (2013.01); *G11B 19/2009* (2013.01)

(58) Field of Classification Search
CPC ......................... G11B 19/2009; G11B 19/2036
USPC ....................................................... 360/99.08
See application file for complete search history.

(56) References Cited

U.S. PATENT DOCUMENTS

| 5,403,098 | A | 4/1995 | Yasui et al. |
| 5,533,811 | A | 7/1996 | Polch et al. |
| 5,558,443 | A | 9/1996 | Zang |
| 5,880,545 | A | 3/1999 | Takemura et al. |
| 6,211,592 | B1 | 4/2001 | Ichiyama |
| 6,246,136 | B1 | 6/2001 | Ichiyama |
| 8,099,746 | B2 * | 1/2012 | Hidaka et al. ............... 720/706 |
| 8,277,125 | B2 | 10/2012 | Kimura et al. |
| 8,567,067 | B2 | 10/2013 | Yamaguchi et al. |

(Continued)

FOREIGN PATENT DOCUMENTS

| DE | 10 2011 014 369 A1 | 9/2012 |
| JP | 6-28335 U | 4/1994 |

(Continued)

OTHER PUBLICATIONS

Kimura, et al.; "Bearing Apparatus, Spindle Motor, and Disk Drive Apparatus"; U.S. Appl. No. 14/024,868, filed Sep. 12, 2013.

(Continued)

*Primary Examiner* — Mark Blouin
(74) *Attorney, Agent, or Firm* — Keating & Bennett, LLP

(57) ABSTRACT

A spindle motor includes a stationary portion and a rotating portion. The stationary portion includes a shaft, a first cup portion. The first cup portion includes a circular plate member and an annular member. The rotating portion includes an annular concave portion that accommodates at least a lower end portion of the annular member. A lubricant is interposed in a gap between a surface of a stationary portion and a surface of the rotating portion. The shaft, the rotating portion, and the lubricant define a fluid dynamic pressure bearing. A connection gap that reaches an inner side of the first cup portion from an outer circumferential surface of the first cup portion is configured between the circular plate member and the annular member. At least a portion of the connection gap is filled with an adhesive.

23 Claims, 9 Drawing Sheets

(56) References Cited

U.S. PATENT DOCUMENTS

| | | | |
|---|---|---|---|
| 8,587,895 B1 | 11/2013 | Sumiji et al. | |
| 8,593,757 B2 * | 11/2013 | Sugi et al. | 360/99.08 |
| 8,630,063 B2 | 1/2014 | Sumiji et al. | |
| 8,711,516 B2 * | 4/2014 | Kodama et al. | 360/99.08 |
| 8,845,194 B2 * | 9/2014 | Kodama et al. | 384/119 |
| 2004/0090702 A1 | 5/2004 | Aiello et al. | |
| 2004/0096131 A1 | 5/2004 | Aiello et al. | |
| 2004/0156568 A1 | 8/2004 | Woldemar et al. | |
| 2004/0165797 A1 | 8/2004 | Oku et al. | |
| 2004/0175062 A1 | 9/2004 | Nishimura et al. | |
| 2005/0031237 A1 | 2/2005 | Gomyo et al. | |
| 2005/0111769 A1 | 5/2005 | Haga | |
| 2005/0225187 A1 | 10/2005 | Hafen et al. | |
| 2006/0002638 A1 | 1/2006 | Ichiyama | |
| 2006/0002641 A1 | 1/2006 | Ichiyama | |
| 2006/0039634 A1 | 2/2006 | Ichiyama | |
| 2006/0039636 A1 | 2/2006 | Ichiyama | |
| 2006/0051001 A1 | 3/2006 | Nishimura et al. | |
| 2006/0182374 A1 | 8/2006 | Schwamberger et al. | |
| 2006/0210205 A1 | 9/2006 | Engesser et al. | |
| 2006/0222276 A1 | 10/2006 | Uenosono | |
| 2007/0030591 A1 | 2/2007 | Engesser et al. | |
| 2007/0133911 A1 | 6/2007 | Nishimoto et al. | |
| 2007/0140606 A1 | 6/2007 | Feng et al. | |
| 2007/0154123 A1 | 7/2007 | Gomyo et al. | |
| 2007/0177832 A1 | 8/2007 | Gotoh et al. | |
| 2007/0211971 A1 | 9/2007 | Obara et al. | |
| 2008/0056104 A1 | 3/2008 | Nishimura et al. | |
| 2008/0063332 A1 | 3/2008 | Yamamoto et al. | |
| 2008/0187257 A1 | 8/2008 | Engesser et al. | |
| 2008/0292228 A1 | 11/2008 | Yamashita et al. | |
| 2009/0129710 A1 | 5/2009 | Ito et al. | |
| 2009/0140587 A1 | 6/2009 | Popov et al. | |
| 2009/0140588 A1 | 6/2009 | Drautz et al. | |
| 2009/0279818 A1 | 11/2009 | Le et al. | |
| 2010/0124387 A1 | 5/2010 | Fuss et al. | |
| 2010/0142869 A1 | 6/2010 | Grantz et al. | |
| 2010/0266225 A1 | 10/2010 | Yamashita et al. | |
| 2010/0296190 A1 | 11/2010 | Yamada et al. | |
| 2010/0321823 A1 | 12/2010 | Oe et al. | |
| 2011/0019303 A1 | 1/2011 | Yamada et al. | |
| 2011/0123139 A1 | 5/2011 | Kimura et al. | |
| 2011/0192210 A1 | 8/2011 | Yamashita et al. | |
| 2012/0033325 A1 | 2/2012 | Mizukami et al. | |
| 2012/0033326 A1 | 2/2012 | Mizukami et al. | |
| 2012/0033327 A1 | 2/2012 | Mizukami et al. | |
| 2012/0033328 A1 | 2/2012 | Mizukami et al. | |
| 2012/0033329 A1 | 2/2012 | Mizukami et al. | |
| 2012/0033330 A1 | 2/2012 | Mizukami et al. | |
| 2012/0063030 A1 | 3/2012 | Yamada et al. | |
| 2012/0243397 A1 | 9/2012 | Yamamoto et al. | |
| 2012/0326543 A1 | 12/2012 | Kimura et al. | |
| 2013/0077190 A1 | 3/2013 | Kimura et al. | |
| 2013/0083426 A1 | 4/2013 | Tamaoka et al. | |
| 2013/0083427 A1 | 4/2013 | Iwasaki et al. | |
| 2013/0120868 A1 | 5/2013 | Mizukami et al. | |
| 2013/0128379 A1 | 5/2013 | Mizukami et al. | |
| 2013/0194701 A1 | 8/2013 | Fukushima | |
| 2013/0242429 A1 | 9/2013 | Iwasaki et al. | |
| 2014/0016229 A1 | 1/2014 | Sekii et al. | |
| 2014/0078617 A1 | 3/2014 | Sekii et al. | |
| 2014/0078879 A1 | 3/2014 | Sekii et al. | |

FOREIGN PATENT DOCUMENTS

| | | |
|---|---|---|
| JP | 6-121484 A | 4/1994 |
| JP | 7-336924 A | 12/1995 |
| JP | 2002-5171 A | 1/2002 |
| JP | 2003-56555 A | 2/2003 |
| JP | 2003-61295 A | 2/2003 |
| JP | 2003-92867 A | 3/2003 |
| JP | 2003-244886 A | 8/2003 |
| JP | 2004-173377 A | 6/2004 |
| JP | 2005-48890 A | 2/2005 |
| JP | 2006-105390 A | 4/2006 |
| JP | 2006-226388 A | 8/2006 |
| JP | 2007-162759 A | 6/2007 |
| JP | 2009-41671 A | 2/2009 |
| JP | 2009-133361 A | 6/2009 |
| JP | 2009-136143 A | 6/2009 |
| JP | 2010-121775 A | 6/2010 |
| JP | 2010-144858 A | 7/2010 |
| JP | 2011-002024 A | 1/2011 |
| JP | 2012-257428 A | 12/2012 |
| WO | 2006/120719 A1 | 11/2006 |

OTHER PUBLICATIONS

Sekii; "Motor and Disk Drive Apparatus"; U.S. Appl. No. 13/886,290, filed May 3, 2013.

\* cited by examiner

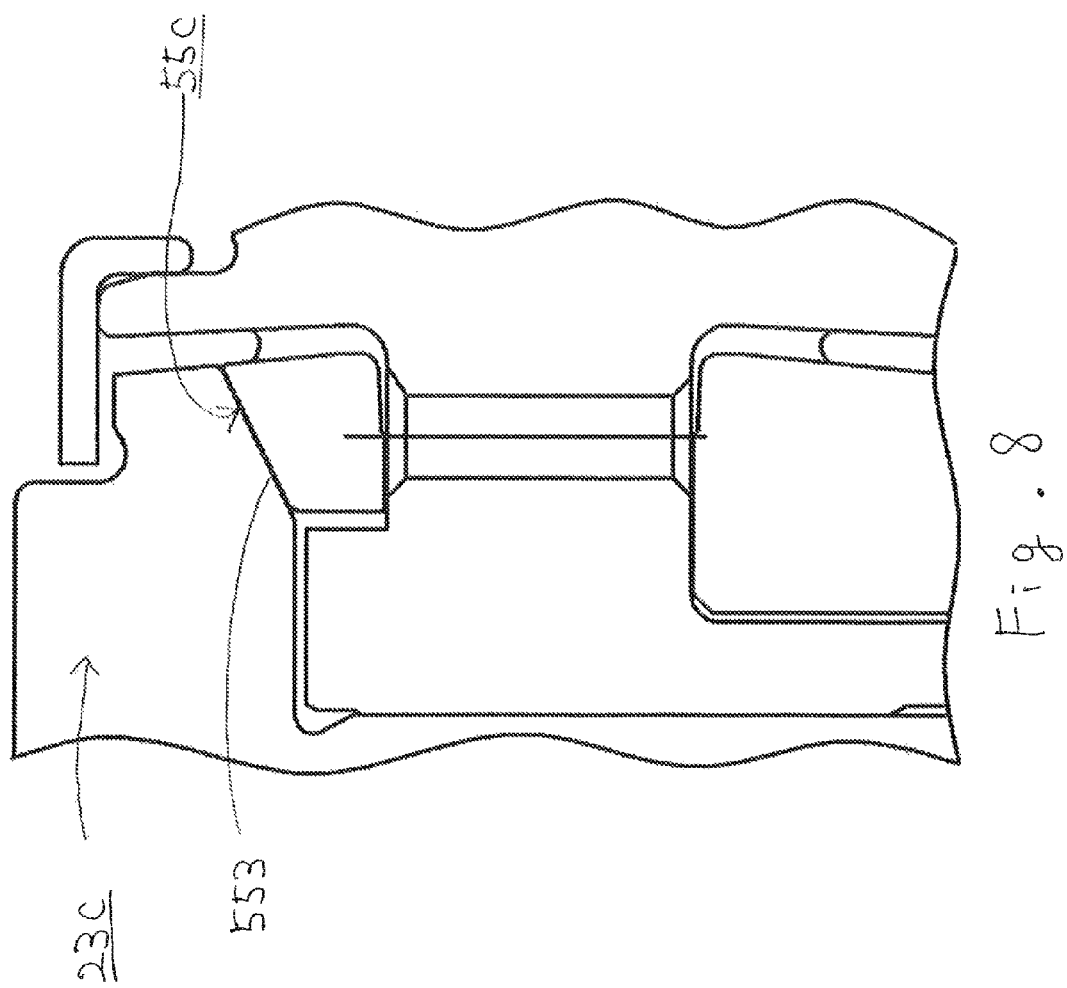

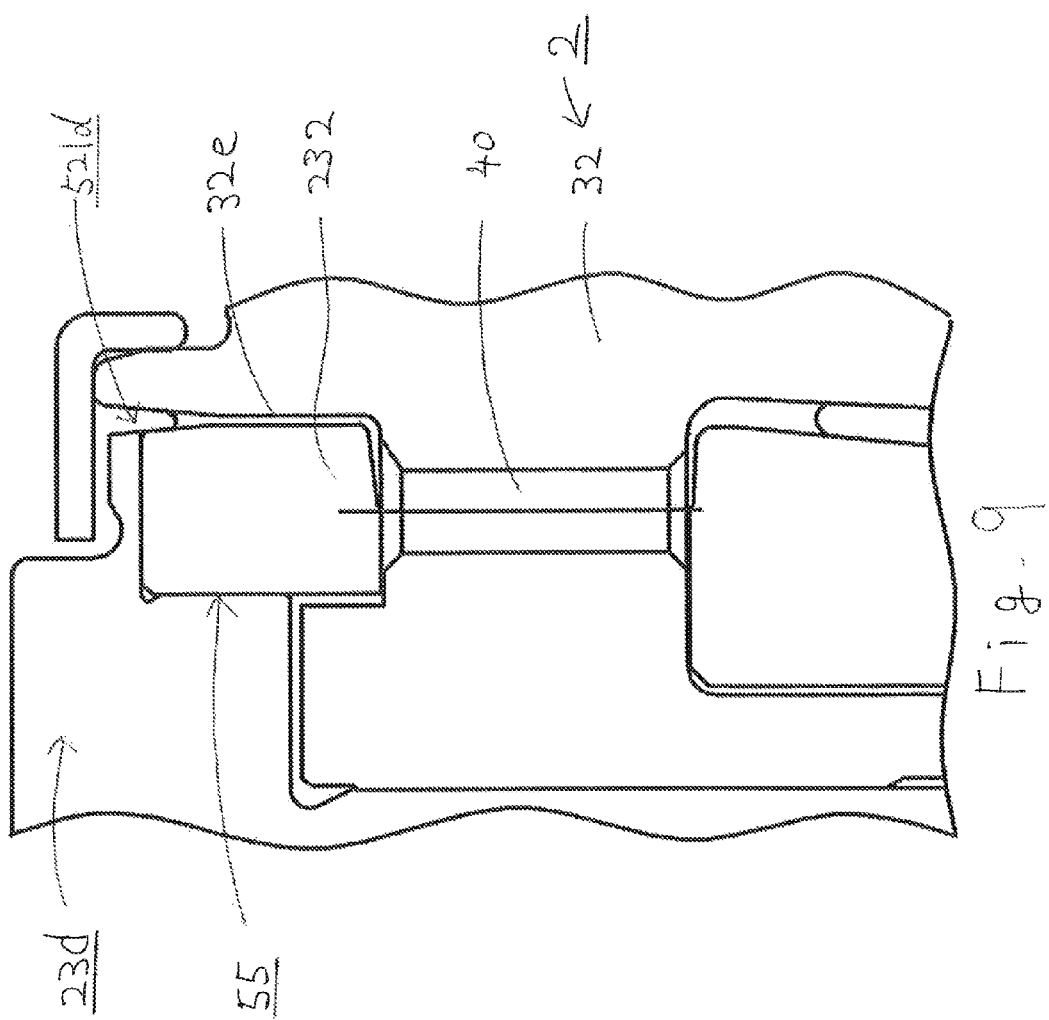

SPINDLE MOTOR, AND DISK DRIVE APPARATUS

BACKGROUND OF THE INVENTION

1. Field of the Invention

The present invention relates to a spindle motor, and a disk drive apparatus.

2. Description of the Related Art

A spindle motor that rotates a disk is mounted on electronic equipment such as a hard disk device. The spindle motor includes a stationary portion that is fixed to a housing of the electronic equipment, and a rotating portion that rotates while supporting the disk.

The stationary portion and the rotating portion of the spindle motor are connected via a dynamic pressure bearing device. In recent years, the dynamic pressure bearing device in which a lubricating fluid is interposed between the stationary portion and the rotating portion is in use in the spindle motor. The dynamic pressure bearing device of the related art and the spindle motor provided with the dynamic pressure bearing device of the related art are disclosed, for example, in DE 102011014369A1.

As shown in FIG. 5, in DE 102011014369A1, a stopper member 218 has a first part 218a and a hollow cylindrical part 28b. A shaft 212 and the first part 218a are integrally formed. In addition, a hollow cylindrical part 218b is fixed to an outer circumferential part of the stopper member 218. In a case where the first part 218a and the hollow cylindrical part 218b are separate members, a bearing oil that is interposed in a motor may leak out of the motor through between the first part 218a and the hollow cylindrical part 218b. Accordingly, it is required for a spindle motor to have a structure that prevents the bearing oil from leaking out of the motor.

SUMMARY OF THE INVENTION

A spindle motor according to a first exemplary preferred embodiment of the present invention includes a stationary portion and a rotating portion. The stationary portion includes a shaft and a first cup portion. The shaft is arranged along a central axis that extends upward and downward. The rotating portion is rotatable about the central axis around the shaft. The first cup portion includes a circular plate member and an annular member that is mounted on the circular plate member. A lower end of the annular member defines at least a portion of a lower end portion of the first cup portion. The rotating portion includes a first upper surface, an annular concave portion, a first inner circumferential surface, and a second inner circumferential surface. The first upper surface faces the circular plate member. The annular concave portion accommodates at least a lower end portion of the annular member. The first inner circumferential surface faces an outer circumferential surface of the shaft. The second inner circumferential surface faces an outer circumferential surface of the first cup portion. A lubricant is interposed in a gap between a surface of the stationary portion and a surface of the rotating portion. The shaft, the rotating portion, and the lubricant define a fluid dynamic pressure bearing. The outer circumferential surface of the first cup portion faces the second inner circumferential surface of the rotating portion via a seal gap that is a radial direction gap. An upper liquid surface of the lubricant is positioned in the seal gap. A connection gap that reaches an inner side of the first cup portion from the outer circumferential surface of the first cup portion is configured between the circular plate member and the annular member and at least a portion of the connection gap is filled with an adhesive.

According to the spindle motor of the first exemplary preferred embodiment of the present invention, the lubricant is prevented from leaking out of a motor from within the fluid dynamic pressure bearing.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a cross-sectional view showing still another modification of a preferred embodiment of the present invention.

FIG. 9 is a cross-sectional view showing still another modification of a preferred embodiment of the present invention.

DETAILED DESCRIPTION OF THE PREFERRED EMBODIMENTS

In the following description, an upper side of a motor in a central axial direction will be simply referred to as an "upper side", and a lower side of the motor in the central axial direction will be simply referred to as a "lower side". Also, an up-down direction does not show positional relationships and directions at a time when preferred embodiments of the present invention are incorporated into actual equipment. In addition, a direction that is parallel or substantially parallel with a central axis will be referred to as an "axial direction", a radial direction about a central axis J1 will be simply referred to as a "radial direction", and a circumferential direction about the central axis will be simply referred to as a "circumferential direction".

Figure 1:
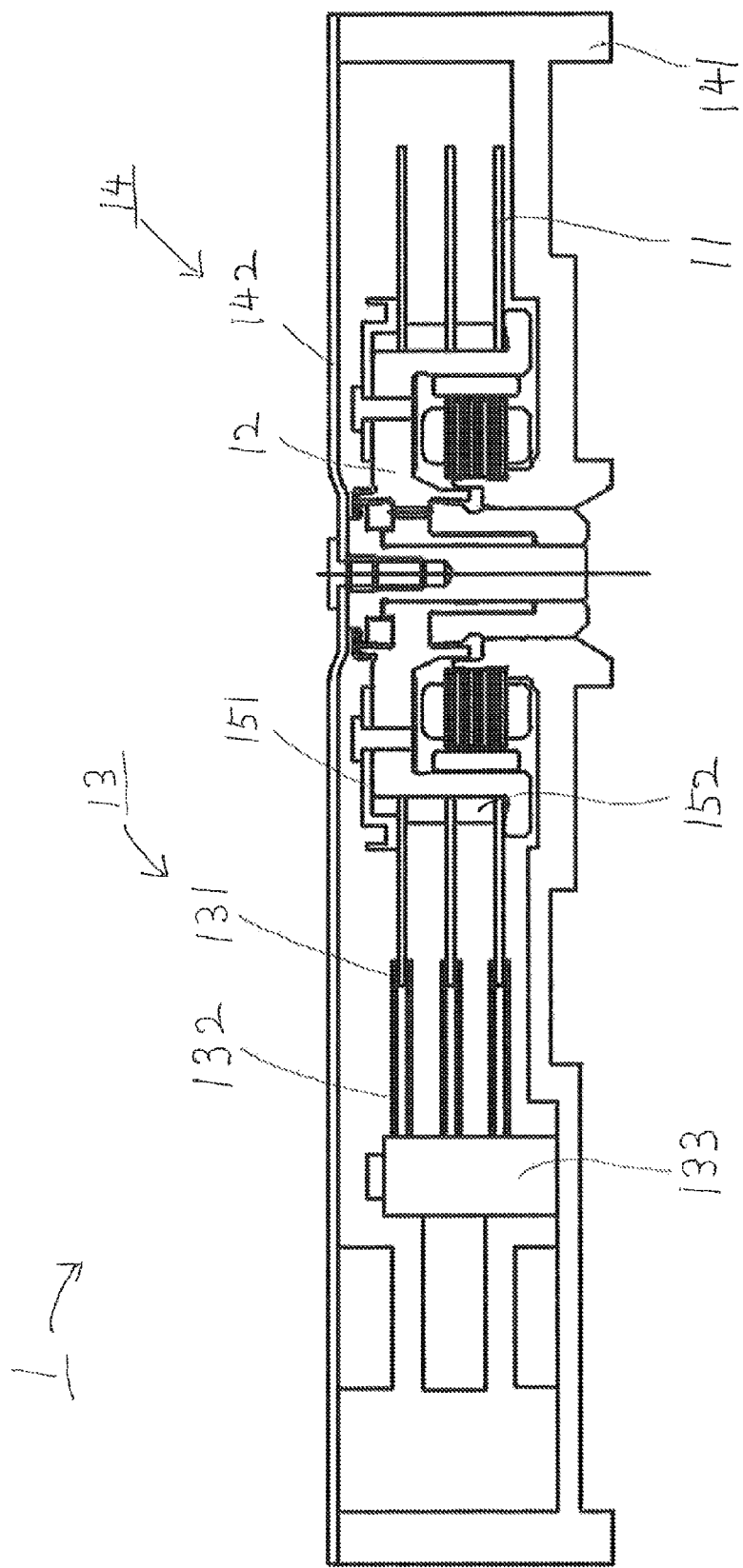
FIG. 1 is a schematic cross-sectional view of a disk drive device according to a preferred embodiment of the present invention.

FIG. 1 is a cross-sectional view showing an internal configuration of a disk drive device 1 that includes a spindle motor 12 (hereinafter, simply referred to as a "motor 12") according to a preferred embodiment of the present invention. The disk drive device 1 is preferably a so-called hard disk drive device. The disk drive device 1 preferably includes, for example, a circular plate-shaped disk 11 that records information, the motor 12, an access unit 13, and a housing 14. The motor 12 holds and rotates the disk 11. The access unit 13 performs reading and writing of the information on the disk 11. Alternatively, the access unit 13 may perform at least one of the reading and the writing of the information on the disk 11.

As shown in FIG. 1, the housing 14 preferably has a cup-shaped or substantially cup-shaped lower housing member 141 and a plate-shaped upper plate member 142. The housing 14 accommodates the motor 12 and the access unit 13. The disk 11, the motor 12, and the access unit 13 are accommodated on an inner side of the lower housing member 141. The upper plate member 142 is fitted into the lower housing member 141 to define the housing 14. It is preferable that an inner space of the disk drive device 1 be a clean space with no or only an extremely small amount of dust or dirt. In this preferred embodiment, the disk drive device 1 is preferably filled with air. The disk drive device 1 may alternatively be filled with helium gas, hydrogen gas, or nitrogen gas. In addition, the disk drive device 1 may be filled with a mixture gas in which these gases are mixed with the air, if so desired.

The three disks 11 are preferably fixed to the motor 12 by a clamper 151 and a spacer 152. The three fixed disks 11 are arranged at regular intervals in a direction of the central axis J1 of the motor 12. The access unit 13 preferably has six heads 131, six arms 132, and a head moving mechanism 133, for example. The head 131 performs the reading and the writing of the information in proximity to the disk 11. The head 131 may perform at least one of the reading and the writing of the information. The arm 132 supports the head 131. The head moving mechanism 133 causes the head 131 to relatively move with respect to the disk 11 by moving the arm 132. According to this configuration, the head 131 has an access to a desired position of the disk 11 in a state where the head 131 is in proximity to the rotating disk 11. The number of the disks 11 is not limited to three and may be one or two or more.

Figure 2:
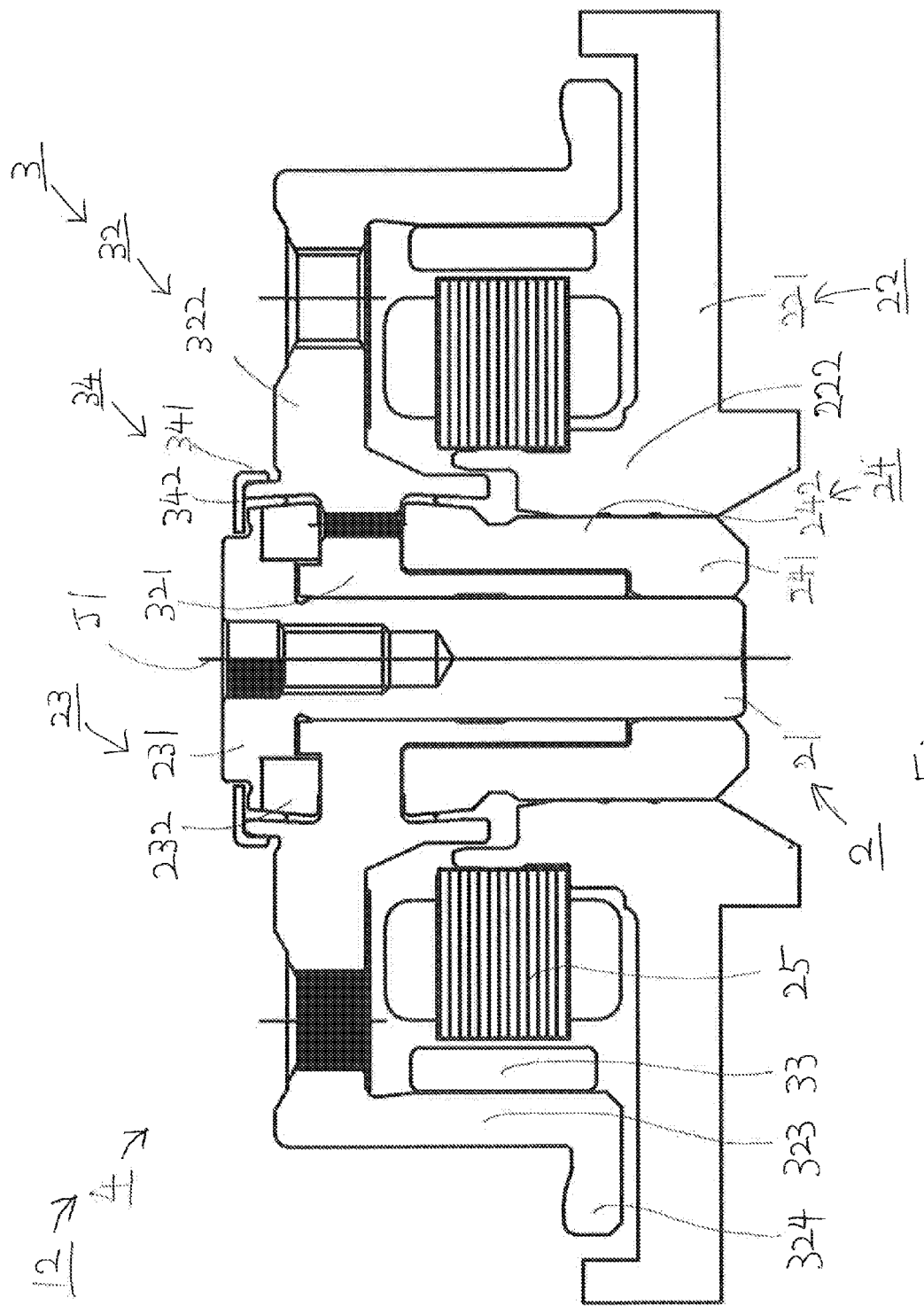
FIG. 2 is a schematic cross-sectional view of a spindle motor according to a preferred embodiment of the present invention.

FIG. 2 is a schematic cross-sectional view of the motor 12 according to a preferred embodiment of the present invention.

The motor 12 is preferably an outer rotor type motor. The motor 12 preferably includes a rotating portion 3, a stationary portion 2, and a lubricant 40. The rotating portion 3 rotates about the central axis J1 via a fluid dynamic pressure bearing mechanism. The fluid dynamic pressure bearing mechanism includes a fluid dynamic pressure bearing 4 that uses a fluid dynamic pressure from the lubricant 40.

The stationary portion 2 preferably includes a shaft 21, a base portion 22, a first cup portion 23, a second cup portion 24, and a stator 25. The shaft 21, the rotating portion 3, and the lubricant 40 preferably define a fluid dynamic pressure bearing 4.

The shaft 21 is arranged along the central axis J1 that extends upward and downward, and has a columnar or substantially columnar shape. The first cup portion 23 is positioned in the vicinity of an upper end portion of the shaft 21. In addition, the second cup portion 24 is positioned in the vicinity of a lower end portion of the shaft 21. The shaft 21 is preferably made of, for example, a metal such as stainless steel.

The upper end portion of the shaft 21 is fixed to the upper plate member 142 of the disk drive device 1 (refer to FIG. 1). The lower end portion of the shaft 21 is fixed to the base portion 22 via the second cup portion 24.

A hole portion (not shown) is preferably defined at a center of the base portion 22. The base portion 22 preferably includes a plate portion 221 that extends in the radial direction, and a cylindrical or substantially cylindrical holder portion 222 that protrudes toward the upper side from an inner edge of the plate portion 221. The base portion 22 may define at least a portion of the lower housing member 141. The base portion 22 may be configured by a member that is connected to the lower housing member 141. In addition, the base portion 22 may be configured as a component separate from the lower housing member 141. The base portion 22 is preferably made, for example, of a metal such as an aluminum alloy.

The first cup portion 23 is a member that preferably has an annular or a substantially annular shape. The first cup portion 23 preferably includes a circular plate member 231 and an annular member 232. The circular plate member 231 extends outward in the radial direction from an upper end of the shaft 21, and is provided by a member that is connected to the shaft 21. The annular member 232 extends toward the lower side from the circular plate member 231 in a cylindrical or a substantially cylindrical shape. The annular member 232 is preferably mounted on the circular plate member 231, and defines at least a portion of a lower end portion of the first cup portion 23. The shaft 21 and the circular plate member 231 may be configured by components separate from each other, and the circular plate member 231 may be fixed to an outer circumferential surface of the shaft 21. The first cup portion preferably has an L-shaped or substantially L-shaped cross section on a boundary between the circular plate member 231 and the annular member 232 due to the circular plate member 231 and the annular member 232. The first cup portion 23 is preferably made, for example, of a metal using copper as a main component or a resin.

The second cup portion 24 is fixed to the outer circumferential surface of the shaft 21 at a position on a further lower side than the first cup portion 23. The second cup portion 24 is preferably, for example, press-fitted in the vicinity of the lower end portion of the shaft 21 and is fixed to the shaft 21 with an adhesive 7. The second cup portion 24 preferably includes a second flat plate portion 241 and a cylindrical portion 242. The second flat plate portion 241 is fixed to the outer circumferential surface of the shaft 21, and extends outward in the radial direction from the shaft 21. In addition, the cylindrical portion 242 protrudes toward the upper side from an outer edge portion of the second flat plate portion 241. The second cup portion 24 preferably has an L-shaped or substantially L-shaped longitudinal section due to the second flat plate portion 241 and the cylindrical portion 242. The second cup portion 24 is preferably made, for example, of a metal using copper as a main component and a resin.

The second cup portion 24 is fixed to the base portion in a state where an outer circumferential surface of the cylindrical portion 242 is in contact with an inner circumferential surface of the holder portion 222 of the base portion 22. In other words, the shaft 21 is fixed indirectly to the base portion 22 via the second cup portion 24. The shaft 21 and the second cup portion 24 may be provided as a single monolithic component, for example.

The stator 25 is preferably mounted on the base portion 22. The stator 25 generates a rotational force (torque) about the central axis J1 between a rotor magnet 33 that is arranged around the shaft 21 and the stator 25. In other words, the stator 25 and the rotor magnet 33 are drive mechanisms that rotate the rotating portion 3 with respect to the stationary portion 2.

The rotating portion 3 preferably includes a rotor hub 32, the rotor magnet 33, and a cap portion 34.

The rotor hub 32 is a rotating member that rotates about the central axis J1 around the shaft 21. The rotor hub 32 preferably includes a sleeve portion 321, a lid portion 322, an outer side cylindrical portion 323, and a flange portion 324. The sleeve portion 321 is preferably a cylindrical or substantially cylindrical portion that includes an inner circumferential surface which faces the outer circumferential surface of the shaft 21. The sleeve portion 321 is arranged between the circular plate member 231 of the first cup portion and the second flat plate portion 241 of the second cup portion 24 in relation to the axial direction. The lid portion 322 extends outward in the radial direction from an upper end portion of the sleeve portion 321. The outer side cylindrical portion 323 extends toward the lower side from an outer edge portion of the lid portion 322. The flange portion 324 protrudes outward in the radial direction from a lower end portion of the outer side cylindrical portion 323. An outer circumferential surface of the outer side cylindrical portion 323 is a contact surface that is in contact with inner circumferential portions of the three disks 11. In addition, an upper surface of the flange portion 324 is a mounting surface where the disk 11 is mounted.

The rotor magnet 33 is preferably fixed to an inner circumferential surface of the outer side cylindrical portion 323 of the rotor hub 32. The rotor magnet 33 preferably has an annular or substantially annular shape about the central axis J1.

The cap portion 34 preferably includes a cap cylindrical portion 341 and a cap lid portion 342. The cap cylindrical portion 341 is a member that has a cylindrical or substantially cylindrical shape about the central axis J1. The cap lid portion 342 is a member that is directed inward in the radial direction from the cap cylindrical portion 341 and has an annular or substantially annular shape. The cap portion 34 is fitted into and mounted on the rotor hub 32.

Figure 3:
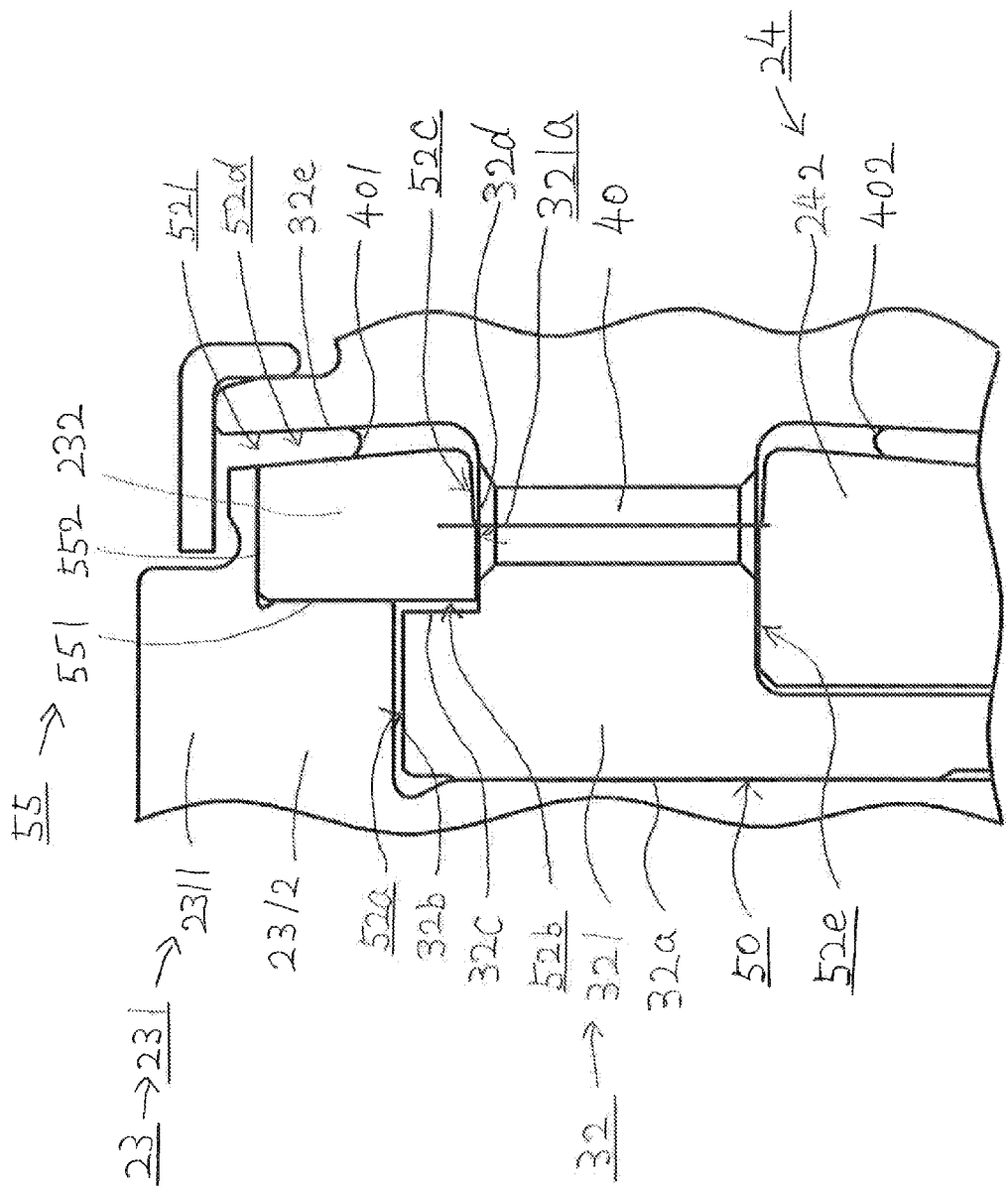
FIG. 3 is a schematic cross-sectional view showing the vicinity of a first cup portion according to a preferred embodiment of the present invention.

FIG. 3 is a schematic cross-sectional view showing the vicinity of the first cup portion 23 according to the present preferred embodiment of the present invention.

A first inner circumferential surface 32a, a first upper surface 32b, a cylindrical surface 32c, a second upper surface 32d, and a second inner circumferential surface 32e are preferably disposed in the sleeve portion 321 of the rotor hub 32. The first inner circumferential surface 32a faces the outer circumferential surface of the shaft 21. The first upper surface 32b is a surface that extends outward in the radial direction from an upper end portion of the first inner circumferential surface 32a. The first upper surface 32b faces a lower surface of the circular plate member 231 of the first cup portion 23 via a first gap 52a. The cylindrical surface 32c is a surface that extends toward the lower side from an outer edge portion of the first upper surface 32b. The cylindrical surface 32c faces an inner circumferential surface of the annular member 232 of the first cup portion 23 via a second gap 52b. The second upper surface 32d is a surface that extends outward in the radial direction from a lower end portion of the cylindrical surface 32c. The second upper surface 32d faces a lower surface of the annular member 232 of the first cup portion 23 via a third gap 52c. The second upper surface 32d is a bottom surface of an annular concave portion 321a that is formed on an upper surface of the sleeve portion 321. A lower end portion of the annular member 232 of the first cup portion 23 is accommodated in the annular concave portion 321a.

The second inner circumferential surface 32e faces an outer circumferential surface of the first cup portion 23 via a fourth gap 52d. The fourth gap 52d is a seal gap that extends in the radial direction. More specifically, the fourth gap 52d has a capillary seal portion 521, the width of which gradually increases toward the upper side in the radial direction. The lubricant 40 is interposed in a gap between a surface of the stationary portion 2 and a surface of the rotating portion 3. An upper liquid surface 401 of the lubricant 40 is positioned in the fourth gap 52d. More specifically, the upper liquid surface 401 of the lubricant 40 is preferably positioned in the capillary seal portion 521. In addition, a lower liquid surface 402 of the lubricant 40 is preferably positioned between the stationary portion 2 and the rotating portion 3 on a further lower side than the annular concave portion 321a. More specifically, the lower liquid surface 402 is positioned between the second cup portion 24 and the rotor hub 32.

A radial dynamic pressure generation groove (not shown) may preferably be disposed on the first inner circumferential surface 32a of the sleeve portion 321. The radial dynamic pressure generation groove induces the fluid dynamic pressure to the lubricant 40 which is held in a gap 50 (hereinafter, referred to as a radial gap 50) between the outer circumferential surface of the shaft 21 and the sleeve portion 321. According to this configuration, a radial dynamic pressure bearing portion (not shown) is configured by the radial gap 50. The radial dynamic pressure generation groove is a group of a plurality of grooves that are arranged in the circumferential direction. Preferably, the radial dynamic pressure generation groove has a herringbone shape. However, the radial dynamic pressure generation groove may alternatively have an arc shape or the like without having to be limited thereto.

An upper thrust dynamic pressure generation groove (not shown) is preferably disposed on the first upper surface 32b of the sleeve portion 321. The thrust dynamic pressure generation groove induces the fluid dynamic pressure to the lubricant 40 which is held in the first gap 52a when the rotating portion 3 rotates. The upper thrust dynamic pressure generation groove is a group of a plurality of grooves that are arranged in the circumferential direction. According to this configuration, an upper thrust dynamic pressure bearing portion (not shown) is configured by the first gap 52a.

In addition, a lower thrust dynamic pressure generation groove (not shown) is preferably disposed on a lower surface of the sleeve portion 321. The lower thrust dynamic pressure generation groove induces the fluid dynamic pressure to the lubricant 40 which is held in a fourth gap 52e when the rotating portion 3 rotates. The fourth gap 52e is configured between the lower surface of the sleeve portion 321 and an upper surface of the cylindrical portion 242. The lower thrust dynamic pressure generation groove is a group of a plurality of grooves that are arranged in the circumferential direction. According to this configuration, a lower thrust dynamic pressure bearing portion (not shown) is preferably configured by the fourth gap 52e.

The upper thrust dynamic pressure generation groove may alternatively be disposed on the lower surface of the circular plate member 231 instead of the first upper surface 32b of the sleeve portion 321. In addition, the lower thrust dynamic pressure generation groove may alternatively be disposed on the upper surface of the cylindrical portion 242 instead of the lower surface of the sleeve portion 321. In addition, the fluid dynamic pressure bearing 4 may include one of the upper thrust dynamic pressure generation groove and the lower thrust dynamic pressure generation groove or may include both the upper thrust dynamic pressure generation groove and the lower thrust dynamic pressure generation groove. In addition, the radial dynamic pressure generation groove may be disposed on the outer circumferential surface of the shaft 21 in the radial dynamic pressure bearing portion.

A connection gap 55 that reaches an inner side of the first cup portion 23 from the outer circumferential surface of the first cup portion 23 is preferably provided between the circular plate member 231 and the annular member 232. As shown in FIG. 3, the connection gap 55 preferably includes an axial direction gap 551 that extends substantially in parallel with the central axis J1 and a radial direction gap 552 that extends vertically or substantially vertically to the central axis J1.

In this preferred embodiment, the circular plate member 231 preferably includes a first flat plate portion 2311 and a protruding portion 2312. The first flat plate portion 2311 preferably has an annular or substantially annular shape. The protruding portion 2312 protrudes toward the lower side from a lower end of the first flat plate portion 2311. A lower surface of the first flat plate portion 2311 faces an upper surface of the annular member 232 in the axial direction via a radial direction gap 552. An outer circumferential surface of the protruding portion 2312 faces the inner circumferential surface of the annular member 232 in the radial direction via the axial direction gap 551. The radial direction gap 552 reaches the outer circumferential surface of the first cup portion 23. In other words, the radial direction gap 552 reaches the capillary seal portion 521. In addition, an axial direction position of the upper liquid surface 401 of the lubricant 40 that is positioned in the capillary seal portion 521 is on a further lower side than an axial direction position where the radial direction gap 552 reaches the capillary seal portion 521. The axial direction gap 551 reaches the inner side of the first cup portion 23. More specifically, the axial direction gap 551 reaches at least one of the first gap 52a and the second gap 52b. Preferably, the length of the axial direction gap 551 in the axial direction is greater than the length of the radial direction gap 552 in the radial direction. The length of the radial direction gap 552 in the radial direction may be greater than the length of the axial direction gap 551 in the axial direction.

The connection gap 55 reaches the inner side of the first cup portion 23 from the outer circumferential surface of the first cup portion 23. Even when the lubricant 40 in the fluid dynamic pressure bearing 4 reaches the outer circumferential surface of the first cup portion 23 through the connection gap 55, the lubricant 40 is preferably accommodated in the capillary seal portion 521, and thus the lubricant 40 is prevented from leaking out of the motor 12.

Figure 4:
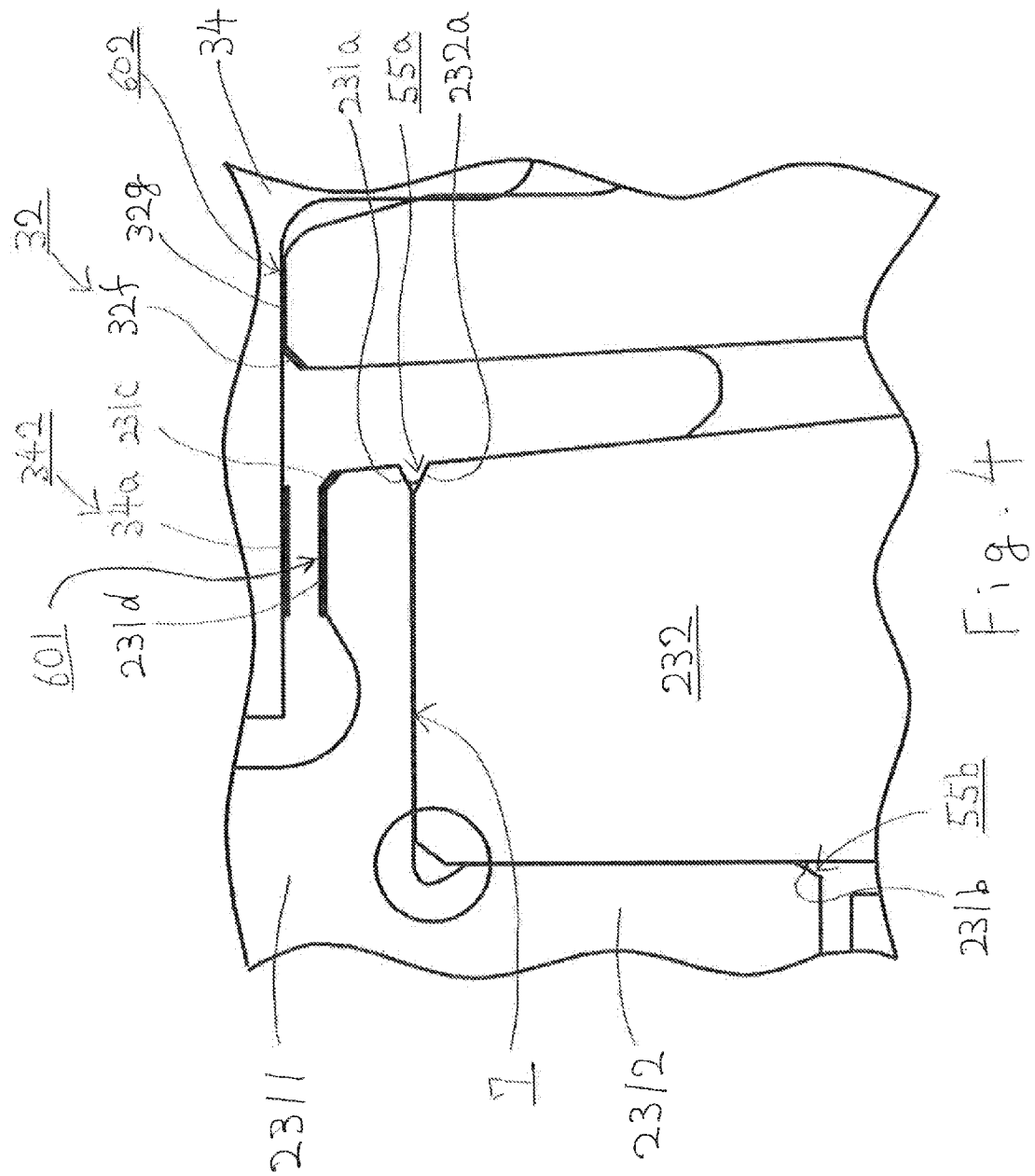
FIG. 4 is a partially enlarged cross-sectional view of FIG. 3.

FIG. 4 is a partially enlarged schematic cross-sectional view of FIG. 3, which shows the motor 12.

A first tapered gap 55a (described later) is preferably arranged at a portion of the connection gap 55 that is open to the seal gap. More specifically, a first flat plate portion lower inclined surface 231a that extends outward and toward the upper side in the radial direction from the lower surface of the first flat plate portion 2311 is arranged at a lower side outer circumferential end edge of the first flat plate portion 2311. An annular member upper inclined surface 232a that extends outward and toward the lower side in the radial direction is arranged at an upper side outer circumferential end edge of the annular member 232. The first flat plate portion lower inclined surface 231a and the annular member upper inclined surface 232a define the first tapered gap 55a. The first tapered gap 55a has a width decreasing in the axial direction inward in the radial direction. An interface of an adhesive 7 is preferably positioned in the first tapered gap 55a. The adhesive 7 is held in the first tapered gap 55a due to surface tension. At least one of the first flat plate portion lower inclined surface 231a and a protruding portion inclined surface 231b (described later) may be a curved surface that extends outward and toward the upper side in the radial direction, and both the first flat plate portion lower inclined surface 231a and the protruding portion inclined surface 231b may be curved surfaces. In addition, at least one of an outer circumferential end edge of the lower surface of the first flat plate portion 2311 and an outer circumferential end edge of the upper surface of the annular member 232 may be an inclined surface. The inclined surface is preferably positioned in the first tapered gap 55a.

A second tapered gap 55b (described later) is arranged at a portion of the connection gap 55 that is open to the inner side of the first cup portion 23. More specifically, a protruding portion inclined surface 231b that extends inward and toward the lower side in the radial direction is arranged at a lower side outer circumferential end edge of the protruding portion 2312. The protruding portion inclined surface 231b and the inner circumferential surface of the annular member 232 preferably define the second tapered gap 55b. The second tapered gap 55b has a width decreasing in the radial direction toward the upper side. The interface of the adhesive 7 is positioned in the second tapered gap 55b. The adhesive 7 is held in the second tapered gap 55b due to surface tension. The inclined surface 231b may be a curved surface that extends inward and toward the lower side in the radial direction.

Since the interface of the adhesive 7 is positioned in the first tapered gap 55a and the second tapered gap 55b, the connection gap 55 is further sealed. In this manner, the lubricant 40 in the fluid dynamic pressure bearing 4 is prevented from leaking out of the motor 12.

A first cup portion upper surface 231d that extends in the radial direction is preferably arranged on an upper surface of the first flat plate portion 2311. In addition, a first flat plate portion upper inclined surface 231c that is inclined outward and toward the lower side in the radial direction from the first cup portion upper surface 231d is arranged at an upper side outer circumferential end edge of the first flat plate portion 2311. Preferably, the first flat plate portion upper inclined surface 231c is provided with a chamfered shape. A first oil-repellent film 601 is preferably arranged over the entire circumference on the first flat plate portion upper inclined surface 231c and the first cup portion upper surface 231d. The first oil-repellent film 601 may be arranged on at least a portion of the first cup portion upper surface 231d, and does not have to be arranged over the first flat plate portion upper inclined surface 231c and the first cup portion upper surface 231d. For example, the first oil-repellent film 601 may be arranged only on the first flat plate portion upper inclined surface 231c, and the first oil-repellent film 601 may be arranged only on the first cup portion upper surface 231d. The first oil-repellent film 601 may be arranged on a lower surface 34a of the cap lid portion 342 that faces the first cup portion upper surface 231d.

The connection gap 55 is preferably positioned on a further lower side than the first oil-repellent film 601 on the outer circumferential surface of the first cup portion 23. Accordingly, the lubricant 40 that reaches the outer circumferential surface of the first cup portion 23 through the connection gap 55 is prevented from leaking out of the motor 12 due to the first oil-repellent film 601.

The rotor hub 32 preferably includes a chamfered surface 32f. The distance between the chamfered surface 32f and the central axis J1 gradually increases toward the upper side from an upper end of the second inner circumferential surface 32e. In addition, the rotor hub 32 preferably includes a third upper surface 32g that extends outward in the radial direction from an upper end of the chamfered surface 32f. The third upper surface 32g is in contact with a lower surface of the cap portion 34. A second oil-repellent film 602 is arranged over the entire circumference on the chamfered surface 32f and the third upper surface 32g. The second oil-repellent film 602 may be arranged on at least the chamfered surface 32f, and does not have to be arranged over the chamfered surface 32f and the third upper surface 32g. For example, the second oil-repellent film 602 may be arranged only on the chamfered surface 32f, and the second oil-repellent film 602 may be arranged only on the third upper surface 32g.

Since the first oil-repellent film 601 and the second oil-repellent film 602 are provided, it is preferably possible to significantly reduce or prevent the leak of the lubricant 40 out of the motor 12 even in a case where the lubricant 40 leaks out from within the fluid dynamic pressure bearing 4 to the capillary seal portion 521 through the connection gap 55.

Figure 5:
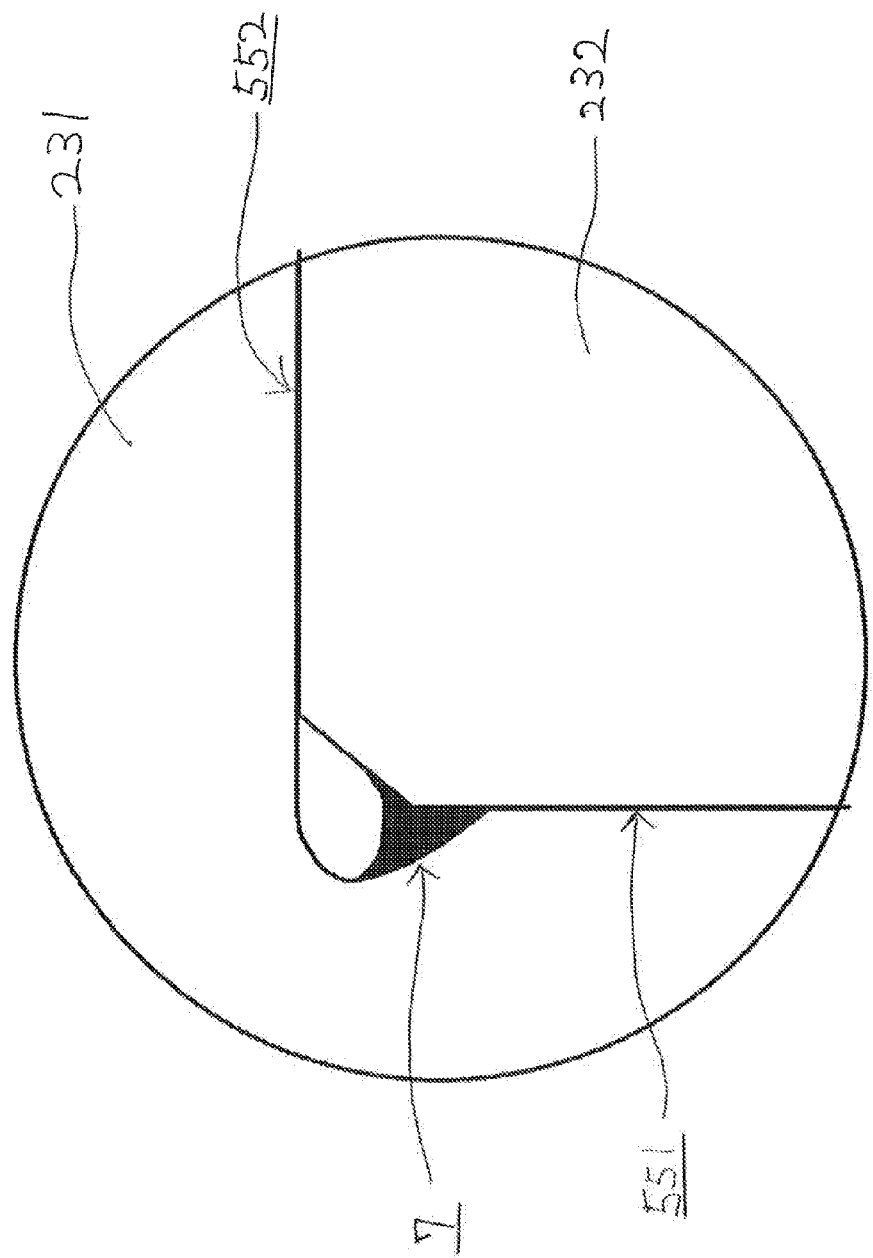
FIG. 5 is a partially enlarged cross-sectional view of FIG. 4.

FIG. 5 is a partially enlarged schematic cross-sectional view of FIG. 4, which shows the motor 12.

As described above, the adhesive 7 is preferably interposed between the circular plate member 231 and the annular member 232. As shown in FIG. 5, the adhesive 7 is interposed in each of at least a portion of the axial direction gap 551 and at least a portion of the radial direction gap 552. More preferably, at least a portion of the axial direction gap 551 and at least a portion of the radial direction gap 552 are filled with the adhesive 7. In other words, the adhesive 7 is preferably filled over the circular plate member 231 and the annular member 232. More specifically, the adhesive 7 is preferably filled over the outer circumferential surface of the protruding portion 2312 and the inner circumferential surface of the annular member 232 in the axial direction gap 551. In addition, the adhesive 7 is preferably filled over the lower surface of the circular plate member 231 and the upper surface of the annular member 232 in the radial direction gap 552.

The adhesive 7 is preferably filled over the outer circumferential surface of the protruding portion 2312 and the inner circumferential surface of the annular member 232 in the axial direction gap 551. In this manner, the lubricant 40 in the fluid dynamic pressure bearing 4 is prevented from leaking out of the motor 12 through the connection gap 55.

The adhesive 7 is applied to at least one of the circular plate member 231 and the annular member 232. Then, the annular member 232 becomes close to the circular plate member 231 and at least a portion of the annular member 232 comes into contact with the circular plate member 231. More preferably, the inner circumferential surface of the annular member 232 and the outer circumferential surface of the protruding portion 2312 are fixed through light press-fitting. In addition, the lower surface of the first flat plate portion 2311 and the upper surface of the annular member 232 are preferably in contact with each other via the adhesive 7. As a result, the annular member 232 is fixed to the circular plate member 231.

The annular member 232 may alternatively be fixed to the circular plate member 231 by another method such as, for example, adhesion, welding, press-fitting, and caulking.

Figure 6:
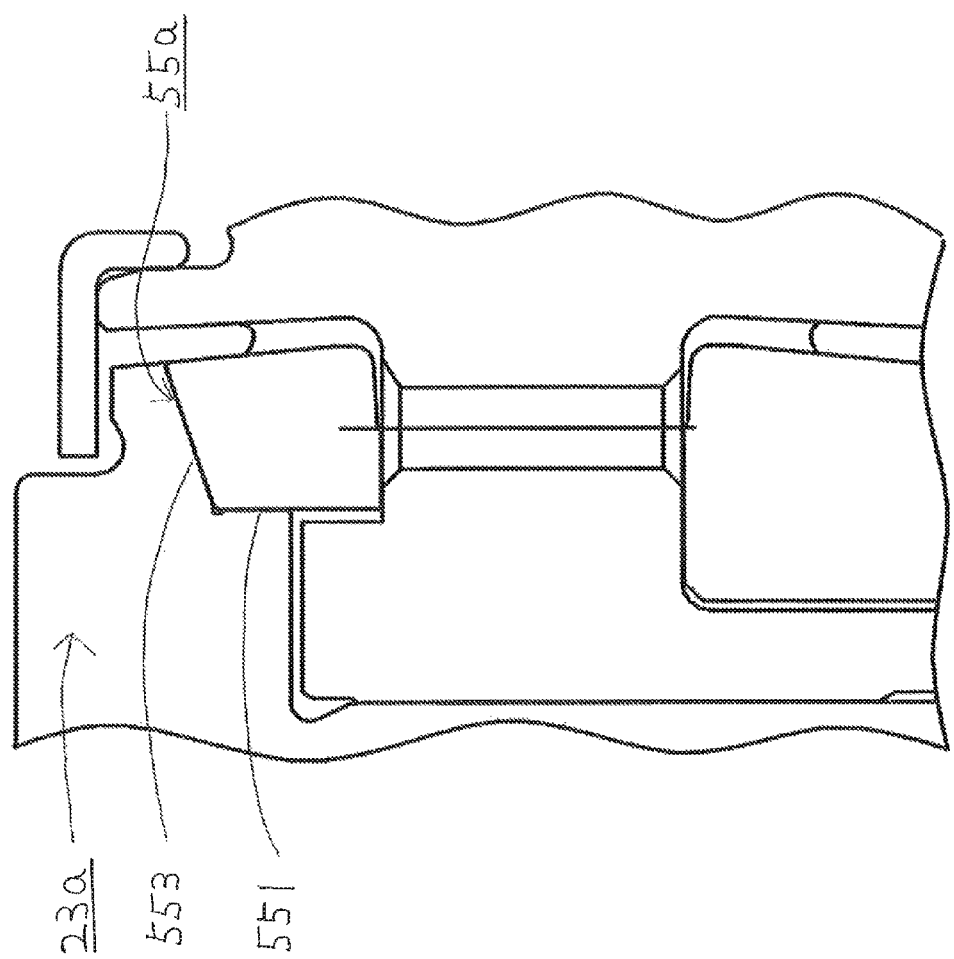
FIG. 6 is a cross-sectional view showing a modification of a preferred embodiment of the present invention.

FIG. 6 is a schematic cross-sectional view showing the vicinity of a first cup portion 23a according to a modification of a preferred embodiment of the present invention. The basic configuration of the modification is preferably the same or substantially the same as the motor 12 according to the above-described preferred embodiment of the present invention.

In the modification, a connection gap 55a preferably includes the axial direction gap 551 that extends in or substantially in parallel with the central axis J1 and an inclination gap 553 that includes an inclined surface which extends at an inclination angle with respect to the central axis J1. The inclination gap 553 may be inclined outward and toward the upper side in the radial direction or may be inclined outward and toward the lower side in the radial direction. In the inclination gap 553, the adhesive 7 is filled over the lower surface of the circular plate member and the upper surface of the annular member.

Preferably, the length of the inclined surface defining the inclination gap 553 is greater than the length of the axial direction gap 551. The length of the inclined surface defining the inclination gap 553 may be smaller than the length of the axial direction gap 551.

In the modification, the connection gap 55a preferably includes the axial direction gap 551 that extends in or substantially in parallel with the central axis J1 and the inclination gap 553 that has the inclined surface which extends at the inclination angle with respect to the central axis J1, and thus an effect similar to that of the above-described preferred embodiment of the present invention is achieved.

Figure 7:
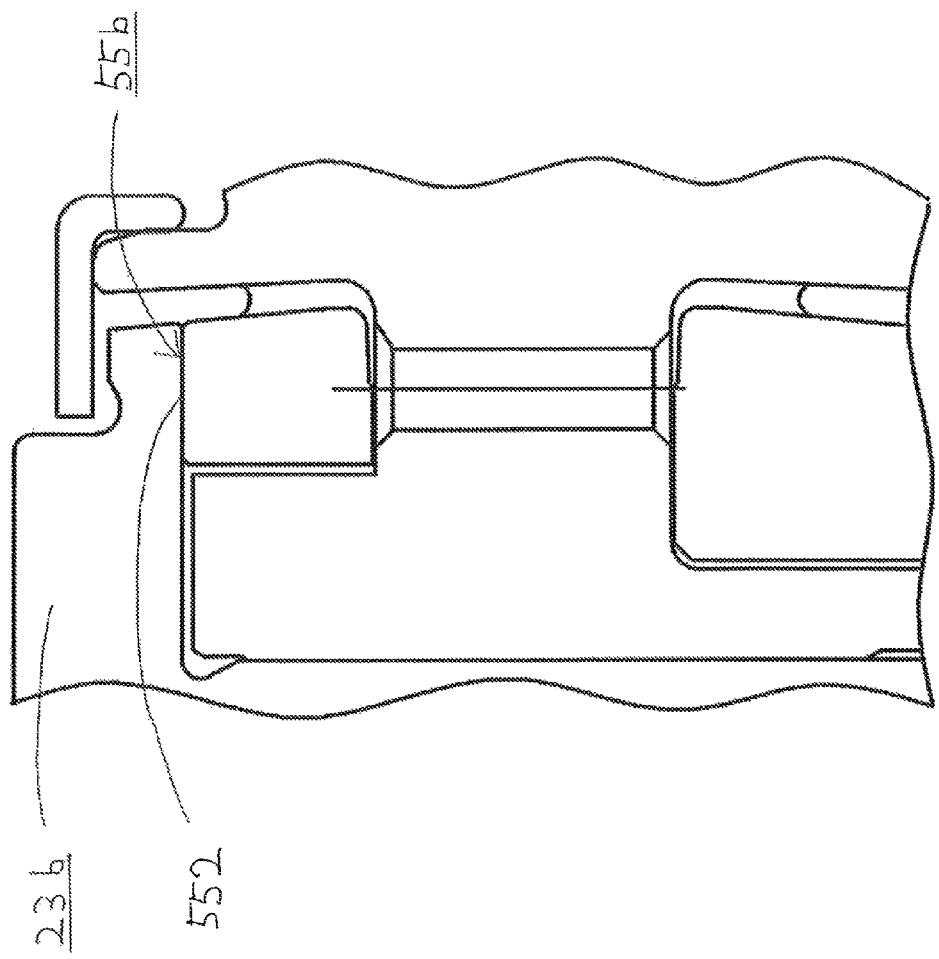
FIG. 7 is a cross-sectional view showing another modification of a preferred embodiment of the present invention.

FIG. 7 is a schematic cross-sectional view showing the vicinity of a first cup portion 23b according to another modification of a preferred embodiment of the present invention. The basic configuration of this modification is preferably the same or substantially the same as the motor 12 according to the above-described preferred embodiment of the present invention.

In this modification, a connection gap 55b preferably includes only the radial direction gap 552 that extends vertically or substantially vertically to the central axis J1. The adhesive 7 is interposed in at least a portion of the radial direction gap 552. More specifically, at least a portion of the radial direction gap 552 is filled with the adhesive 7.

In this modification, the connection gap 55b preferably includes only the radial direction gap 552 that extends vertically or substantially vertically to the central axis J1, and thus an effect similar to that of the above-described preferred embodiment of the present invention is achieved.

FIG. 8 is a schematic cross-sectional view showing the vicinity of a first cup portion 23c according to still another modification of a preferred embodiment of the present invention. The basic configuration of this modification is preferably the same as the motor 12 according to the above-described preferred embodiment of the present invention.

In this modification, a connection gap 55c has only the inclination gap 553 that extends at the inclination angle with respect to the central axis J1. The inclination gap 553 may be inclined outward and toward the upper side in the radial direction or may be inclined outward and toward the lower side in the radial direction. In addition, the inclination gap 553 may be connected to at least a portion of the first gap 52a and the second gap 52b. The inclination gap 553 may be connected to only the first gap 52a or may be connected to only the second gap 52b. The adhesive 7 is interposed in at least a portion of the inclination gap 553. More specifically, at least a portion of the inclination gap 553 is filled with the adhesive 7.

In this modification, the connection gap 55c preferably includes only the inclination gap 553 that extends at the inclination angle with respect to the central axis J1, and thus an effect similar to that of the above-described preferred embodiment of the present invention is achieved.

FIG. 9 is a schematic cross-sectional view showing the vicinity of a first cup portion 23d according to still another modification of the above-described preferred embodiment of the present invention. The basic configuration of this modification is preferably the same or substantially the same as the motor 12 according to the above-described preferred embodiment of the present invention.

In this modification, a pumping groove array (not shown) is preferably disposed on an outer circumferential surface of the first cup portion 23d or the second inner circumferential surface 32e of the rotor hub 32. When the rotating portion 3 rotates, the lubricant 40 is pressed down to the lower end portion side of the annular member 232 due to an operation of the pumping groove array. In addition, a capillary seal portion 521d where a gap in the radial direction between the outer circumferential surface of the first cup portion 23d and the second inner circumferential surface 32e of the rotor hub 32 gradually widens toward the upper side is preferably disposed on the upper side of the pumping groove array. The connection gap 55 may reach an area that defines the capillary seal portion 521d. In addition, the connection gap 55 may reach an area where the pumping seal groove array is configured.

Exemplary preferred embodiments of the present invention and modifications thereof have been described above. However, the present invention is not limited to the above-described preferred embodiments and modifications described above.

In the fluid dynamic pressure bearing 4, the radial dynamic pressure bearing portion may be omitted and at least only one of the thrust dynamic pressure bearing portions may be provided.

Both a rotating shaft type spindle motor and a fixed shaft type spindle motor can be used as the spindle motor. In addition, both an outer rotor type spindle motor and an inner rotor type spindle motor can be used as the spindle motor.

In addition, the spindle motor can be used in various types of equipment such as a fan, without having to be limited to the disk drive device.

In addition, the connection gap may have all of the axial direction gap, the radial direction gap, and the inclination gap.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
a stationary portion including a shaft arranged along a central axis which extends upward and downward, and a first cup portion; and
a rotating portion that is rotatable about the central axis around the shaft; wherein
the first cup portion includes a circular plate member and an annular member that is mounted on the circular plate member;
a lower end of the annular member defines at least a portion of a lower end portion of the first cup portion;
the rotating portion includes:
    a first upper surface that faces the circular plate member;
    an annular concave portion that accommodates at least a lower end portion of the annular member;
    a first inner circumferential surface that faces an outer circumferential surface of the shaft; and
    a second inner circumferential surface that faces an outer circumferential surface of the first cup portion;
wherein
a lubricant is interposed in a gap between a surface of the stationary portion and a surface of the rotating portion;
the shaft, the rotating portion, and the lubricant define a fluid dynamic pressure bearing;
the outer circumferential surface of the first cup portion faces the second inner circumferential surface of the rotating portion via a seal gap that is a radial direction gap;
an upper liquid surface of the lubricant is positioned in the seal gap; and
a connection gap that reaches an inner side of the first cup portion from the outer circumferential surface of the first cup portion is configured between the circular plate member and the annular member and at least a portion of the connection gap is filled with an adhesive.

2. The spindle motor according to claim 1,
wherein the connection gap includes an axial direction gap that extends in parallel or substantially in parallel with the central axis, and at least one of a radial direction gap that extends vertically or substantially vertically to the central axis and an inclination gap that includes an inclined surface which extends at an inclination angle with respect to the central axis.

3. The spindle motor according to claim 2, wherein
the circular plate member includes a protruding portion that protrudes toward a lower side;
a lower surface of the circular plate member faces an upper surface of the annular member in an axial direction via the radial direction gap; and
an outer circumferential surface of the protruding portion faces the inner circumferential surface of the annular member in the radial direction via the axial direction gap.

4. The spindle motor according to claim 2, wherein
a length of the axial direction gap in the axial direction is greater than a length of the radial direction gap in the radial direction.

5. The spindle motor according to claim 2, wherein
the adhesive is interposed in each of at least a portion of the axial direction gap, and at least a portion of the radial direction gap or at least a portion of the inclination gap.

6. The spindle motor according to claim 5, wherein
at least a portion of the axial direction gap, and at least a portion of the radial direction gap or at least a portion of the inclination gap are filled with the adhesive.

7. The spindle motor according to claim 6, wherein
the adhesive is filled over the outer circumferential surface of the protruding portion and the inner circumferential surface of the annular member in the axial direction gap.

8. The spindle motors according to claim 6, wherein
the adhesive is filled over the lower surface of the circular plate member and the upper surface of the annular member in the radial direction gap.

9. The spindle motor according to claim 6, wherein
the adhesive is filled over the lower surface of the circular plate member and the upper surface of the annular member in the inclination gap.

10. The spindle motor according to claim 1, wherein
the connection gap is a radial direction gap that extends vertically or substantially vertically to the central axis.

11. The spindle motor according to claim 10, wherein
the adhesive is interposed in at least a portion of the radial direction gap.

12. The spindle motor according to claim 11, wherein
at least a portion of the radial direction gap is filled with the adhesive.

13. The spindle motor according to claim 1, wherein
the connection gap is an inclination gap that includes an inclined surface which extends at an inclination angle with respect to the central axis.

14. The spindle motor according to claim 13, wherein
the adhesive is interposed in at least a portion of the inclination gap.

15. The spindle motor according to claim 14, wherein
at least a portion of the inclination gap is filled with the adhesive.

16. The spindle motor according to claim 1, wherein
a first tapered gap is configured at a portion of the connection gap that is open to the seal gap;
the first tapered gap has a width decreasing in an axial direction inward in a radial direction; and
an interface of the adhesive is positioned in the first tapered gap.

17. The spindle motor according to claim 16, wherein
the circular plate member includes a first flat plate portion;
at least one of an outer circumferential end edge on a lower surface of the first flat plate portion and an outer circumferential end edge on an upper surface of the annular member is an inclined surface; and the inclined surface is positioned in the first tapered gap.

18. The spindle motor according to claim 1, wherein
a second tapered gap is configured at a portion of the connection gap that is open to the inner side of the first cup portion;
the second tapered gap has a width decreasing in a radial direction toward an upper side; and
an interface of the adhesive is positioned in the second tapered gap.

19. The spindle motor according to claim 1, wherein
the circular plate member is configured to be connected to the shaft.

20. The spindle motor according to claim 1, wherein
a pumping groove array is disposed on the outer circumferential surface of the first cup portion or the second inner circumferential surface of the rotating portion.

21. The spindle motor according to claim 20, wherein
a capillary seal portion where a gap in the radial direction between the outer circumferential surface of the first cup portion and the second inner circumferential surface gradually widens toward an upper side is disposed on an upper side of the pumping groove array.

22. The spindle motor according to claim 1, wherein
the seal gap includes a capillary seal portion that gradually widens toward an upper side; and
upper liquid surface of the lubricant is positioned in the capillary seal portion.

23. A disk drive apparatus that is provided with a disk, the disk drive apparatus comprising:
the spindle motor according to claim 1 that rotates the disk;
an access unit configured to perform at least one of reading and writing of information on the disk; and
a housing that accommodates that spindle motor and the access unit.

* * * * *